E. Hill,
Baling Press.
No. 109,515.      Patented Nov. 22, 1870.
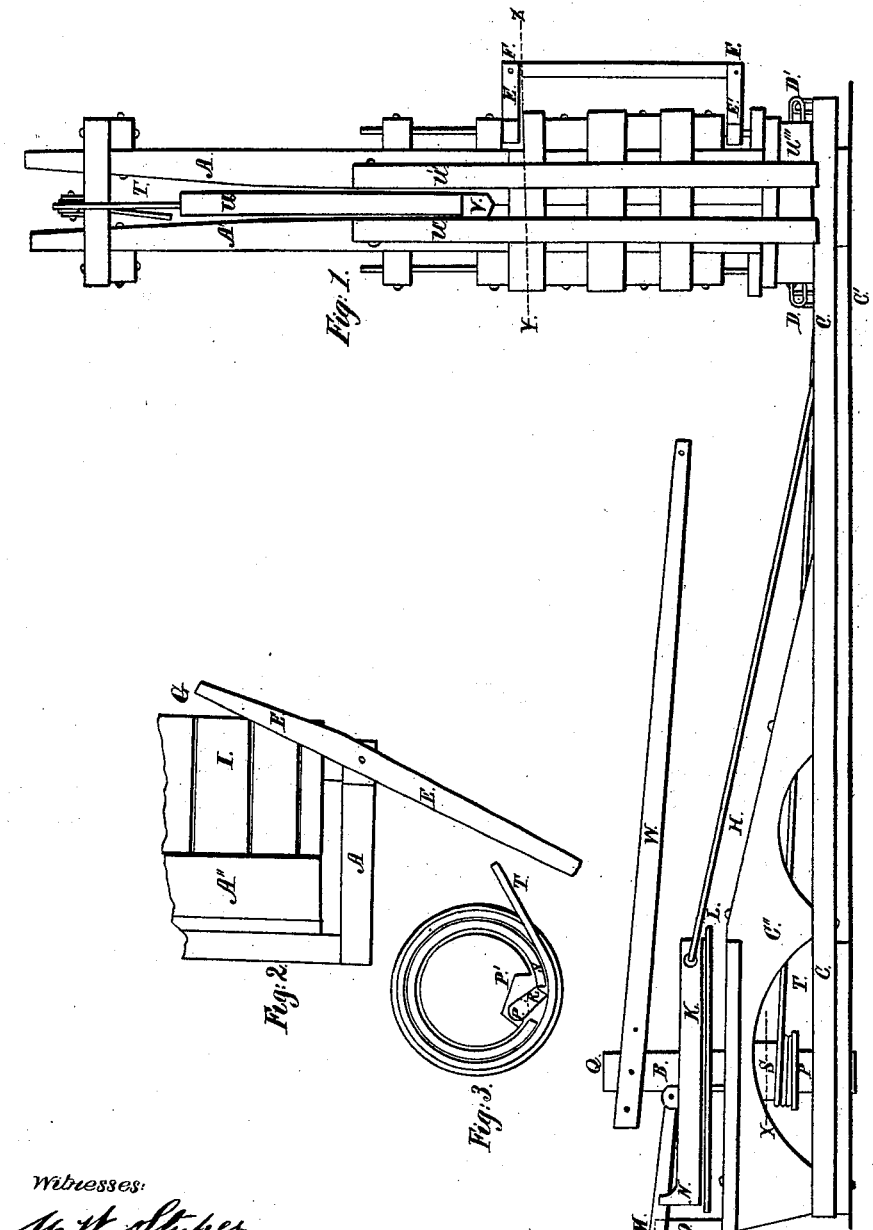
Witnesses:
M. H. Stypes
[signature]
Inventor:
Elias Hill.
By Samuel Jacob Wallace
His Attorney

United States Patent Office.

ELIAS HILL, OF HAMILTON, ILLINOIS.

Letters Patent No. 109,515, dated November 22, 1870.

IMPROVEMENT IN BALING-PRESSES.

The Schedule referred to in these Letters Patent and making part of the same.

*To all whom it may concern:*

Be it known that I, ELIAS HILL, of Hamilton, Hancock county, Illinois, have made a new and useful Improvement in Baling-Presses; which I declare to be made and used substantially as shown and set forth herein and in the accompanying drawing, corresponding letters of reference being used throughout.

Figure 1 is a side elevation or plan of my improved press;

Figure 2 is a partial section, on line Y Z of same; and

Figure 3 is a section on line X of same, showing details.

My invention relates to the class of portable presses in ordinary use for baling hay and other products in fields, &c.; and My improvements consist, mainly, in some combinations and novelties which are of economic importance and value.

A is the upright press.

B is the horse-power.

C is the base-frame, on which the horse-power is built and upon which the press stands.

D is a hinge joint, by which press A is attached to frame C so that it may be turned over on its side onto the frame with the horse-power into shape for loading onto wheels for moving from one place to another, without taking apart into separate pieces, as is usually required.

I use a suitable rack or frame, made with two windlasses and ropes, so arranged that, in turning the press down or raising it for work, one rope will reach upward from the top of the press and sustain the weight, while the other reaches downward to draw it over in lowering.

In this way my press can be made ready for moving at once, and it can be as readily set down and set for work, the whole requiring but a few minutes' labor, and no trouble or danger of loosing or misplacing the several parts and adjustments.

For readily discharging the bale I make a double lever, E E', with its two arms hinged at one side of the press-door, and reaching partly across it, just above and below the door, in opening and shutting, and having the other ends of the levers reaching out to one side for handles, F F'

The arms, before the place of the bale in the press, have hooks, G, on their ends, to hook into the bale I to draw it out.

The horse-power B I make with arrangements so that the rope H therefrom, which is made to work the "beater" in much the usual way, shall operate automatically, by attaching the end of the rope H to a horizontal ring, K, which encircles the turn-table L of the horse-power, and which is locked thereto by a lever, M, which falls into a notch at N in the ring K, to cause the ring to turn with the table and wind up the rope, lifting the beater to the top of the press, to allow a fresh supply of loose hay to be introduced under it in the press.

When the lever M, in turning, reaches a shoe, O, on the horse-power, and is raised by it from the notch in the ring K, setting it free to turn back and drop the beater and compress the hay, which is repeated until enough for a bale is ready, when the workman or driver raises the lever M from the ring K, leaving it loose, and turns the lever to one side, thus turning the small shaft P, into which it is pivoted, and which runs down the main shaft Q of the horse-power, so that a flanged edge, R, of this shaft P shall turn out, as in fig. 3, and engage into the edge of a notch cut into a broad band, S, which encircles, loosely, the lower end part of the shaft Q, so as to cause the band S to turn with the horse-power and wind up on the band the ropes. T, which draw upon the levers U at the ends of the press, which act therefrom to press down upon the beater-head V in the press, and compact the bale therein very densely, when it may be banded as usual; and when done, the driver, by turning back the lever M, may release the band S, and the ropes T, and levers U, and beater-head V, at the same time throwing the ring K into action again to lift the beater to free the bale and begin another.

By this arrangement of horse-power I secure an alternate action, entirely automatic and self-regulating, excepting a single action to change from one operation to the other, thus obviating the usual chances of mistakes, &c.

I claim—

1. The combination and arrangement of the press A and the base-frame C with the hinge D, when constructed and operating as shown and described, for the purpose set forth.

2. The arrangement of the press A, double levers E E, and handle F, base-frame C, hinge D, horse-power B, with rope H, and ring K, when all these are constructed and operated as shown and described, for the purposes set forth.

ELIAS HILL.

Witnesses:
SAMUEL JACOB WALLACE,
EZRA DAVIS.